(12) United States Patent
El Dokor

(10) Patent No.: US 10,845,890 B1
(45) Date of Patent: *Nov. 24, 2020

(54) GESTURE KEYBOARD METHOD AND APPARATUS

(71) Applicant: Edge 3 Technologies, Inc., Phoenix, AZ (US)

(72) Inventor: Tarek El Dokor, Phoenix, AZ (US)

(73) Assignee: Edge 3 Technologies, Inc., Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,588

(22) Filed: Dec. 23, 2018

Related U.S. Application Data

(63) Continuation of application No. 14/556,173, filed on Nov. 30, 2014, now Pat. No. 10,162,429, which is a continuation of application No. 13/471,494, filed on May 15, 2012, now Pat. No. 8,928,590.

(60) Provisional application No. 61/619,915, filed on Apr. 3, 2012.

(51) Int. Cl.
| | |
|---|---|
| *G06F 3/023* | (2006.01) |
| *G06F 3/0488* | (2013.01) |
| *G06F 3/03* | (2006.01) |
| *G06F 3/01* | (2006.01) |
| *G06F 3/02* | (2006.01) |

(52) U.S. Cl.
CPC ............ *G06F 3/0233* (2013.01); *G06F 3/017* (2013.01); *G06F 3/02* (2013.01); *G06F 3/0219* (2013.01); *G06F 3/0304* (2013.01); *G06F 3/04883* (2013.01)

(58) Field of Classification Search
CPC .. G06F 3/0233; G06F 3/04883; G06F 3/0304; G06F 3/017; G06F 3/0219; G06F 3/02
See application file for complete search history.

(56) References Cited

U.S. PATENT DOCUMENTS

| | | |
|---|---|---|
| 5,821,922 A | 10/1998 | Sellers |
| 6,614,422 B1 | 9/2003 | Rafii |
| 6,750,848 B1 | 6/2004 | Pryor |

(Continued)

*Primary Examiner* — Vinh T Lam
(74) *Attorney, Agent, or Firm* — Gordon Kessler

(57) ABSTRACT

A gesture-enabled keyboard and method are defined. The gesture-enabled keyboard includes a keyboard housing including one or more keyboard keys for typing, a pair of stereo camera sensors mounted within the keyboard housing, a field of view of the pair of stereo camera sensors projecting substantially perpendicularly to the plane of the keyboard housing, and a pair of micro-electronic machines, each of the micro-electronic machines being coupled with, and adapted to adjust a position of a corresponding one of the pair of stereo cameras. A background of the field of view is updated when one or more alternative input devices are in use. A gesture region including a plurality of interaction zones and a virtual membrane defining a region of transition from one of the plurality of interaction zones to another of the plurality of interaction zones is defined within the field of view of the pair of stereo camera sensors. Gesture interaction is enabled when one or more gesture objects are positioned within the gesture region, and when one or more alternative input devices are not in use.

18 Claims, 7 Drawing Sheets

(56) References Cited

U.S. PATENT DOCUMENTS

| | | | |
|---|---|---|---|
| 8,928,590 B1 * | 1/2015 | El Dokor | G06F 3/0233 |
| | | | 345/168 |
| 10,162,429 B2 * | 12/2018 | El Dokor | G06F 3/0233 |
| 2002/0171633 A1 | 11/2002 | Brinjes | |
| 2006/0033701 A1 | 2/2006 | Wilson | |
| 2010/0134612 A1 | 6/2010 | Pryor et al. | |
| 2011/0006991 A1 | 1/2011 | Elias | |
| 2011/0015504 A1 | 1/2011 | Yoo | |
| 2011/0205186 A1 | 8/2011 | Newton et al. | |
| 2011/0313721 A1 | 12/2011 | Keshavmurthy | |
| 2011/0320405 A1 | 12/2011 | Hsu et al. | |
| 2013/0082928 A1 | 4/2013 | Kim | |
| 2013/0257734 A1 | 10/2013 | Marti | |
| 2014/0006997 A1 | 1/2014 | Kim | |

* cited by examiner

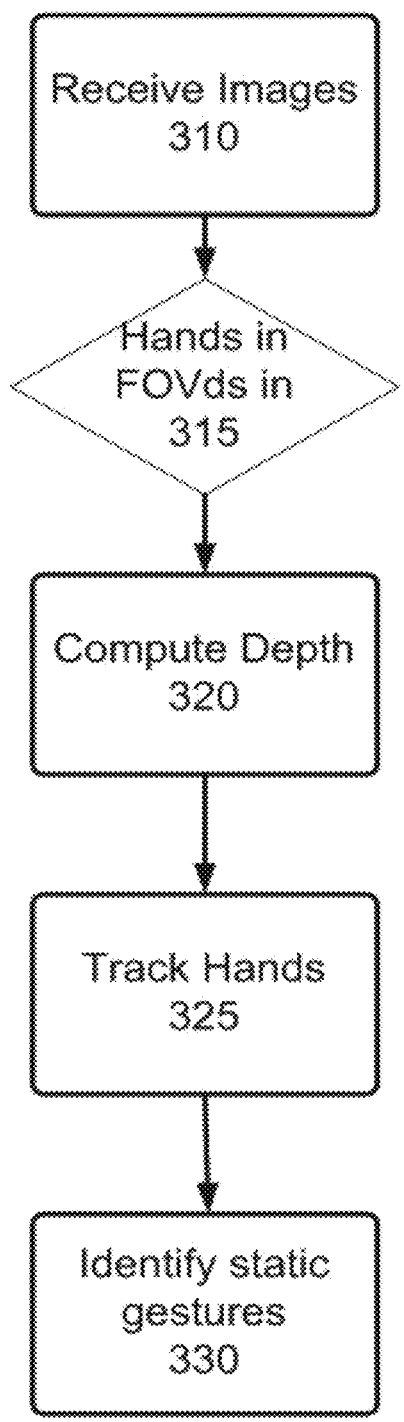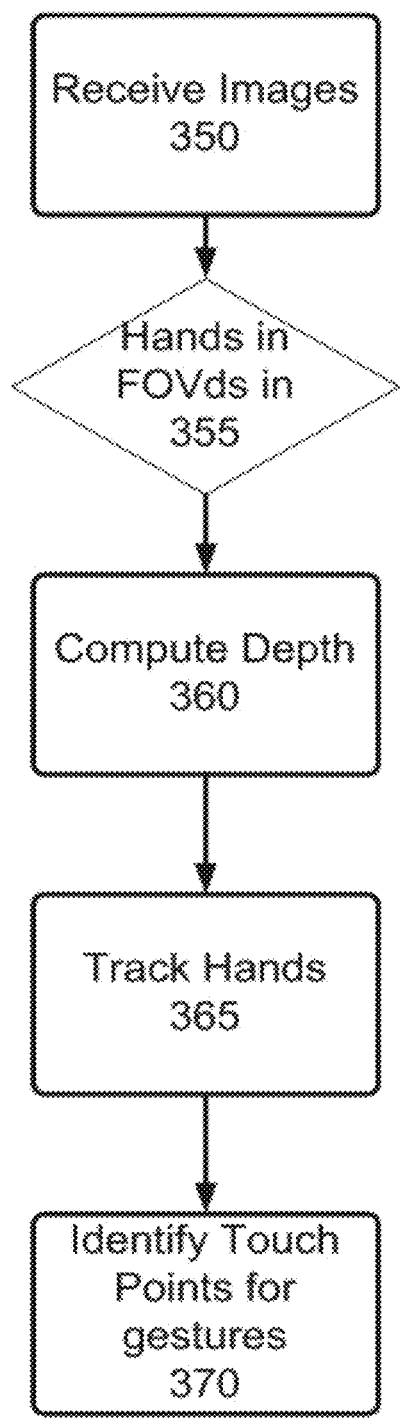
FIGURE 3(a)
FIGURE 3(b)

GESTURE KEYBOARD METHOD AND APPARATUS

CROSS REFERENCE TO RELATED APPLICATIONS

This application is a continuation of U.S. patent application Ser. No. 14/556,173, filed Nov. 30, 2014, to El Dokor et al., titled "Gesture Enabled Keyboard", which is a continuation of U.S. patent application Ser. No. 13/471,494, filed May 20, 2012 to El Dokor et al., titled "Gesture Keyboard Method and Keyboard Apparatus", now U.S. Pat. No. 8,928,590, which in turn claims the benefit of U.S. Provisional Patent Application Ser. No. 61/619,915 filed Apr. 3, 2012 to El Dokor, titled "Gesture Keyboard Method and Apparatus", the contents of each of these applications being incorporated herein by reference.

FIELD OF THE INVENTION

This invention relates generally to a computer or other keyboard supporting the use of gesture commands, and more particularly to a computer keyboard including one or more cameras therein to image a user gesture, and to allow for the processing of this imaged user gesture to issue one or more commands to a processing system.

BACKGROUND OF THE INVENTION

As Kinect®-like devices become more prevalent in the consumer space, they are empowering a brand new generation of user interfaces, ones that are enabled with gesture recognition. Front-facing gesture recognition, with cameras placed in peripheral devices for game consoles or PCs, is very powerful, enabling fun, aerobic gesture controls for games. The inventors of the present invention have recognized that this approach, however, suffers from a number of drawbacks: often times, sensors don't work very well, or even at all, in regions that are close to the screen or lower in the field-of-view (FOV) of the sensors. Because these are essential areas of interaction for the user, these users are left with the choice of foregoing such interaction, or attempting the interaction at great discomfort. With cameras placed in the bezel of a screen, some regions of desired interaction cannot be viewed by the camera, even if the cameras are provided having a wide field of view. More importantly, for current technologies being utilized in gesture recognition with either time-of-flight (TOF) or structured light, peripherally located objects relative to the FOV may not be easily viewed by the camera, and may have poor reflectivity, vis-à-vis a light source that is associated with camera or image sensor. Many such objects may have slanted surfaces at such locations in the FOV that image distortions, associated with both the lenses and the light source, present a very serious challenge, both, in engineering and usability.

Many are the advantages of gesture recognition, enabling a more natural means of interaction between the user and their surroundings. Gesture recognition today is especially attractive for playing games, by enabling user gestures. This is evidenced by millions of Kinect® users who have taken to such interfaces very naturally. The gesture lexicon that is associated with a gesture recognition system is typically simplistic, involving coarse body gestures and tracking the user's entire body in the FOV, which is impractical for near-touch interaction. In this case, the gesture lexicon itself is monolithic, mostly recycling very similar gestures across multiple games.

While gesture recognition has proven to be very valuable for games, it has been considered less valuable in other settings that require more precise motion tracking, or that require a greater degree of robustness, more integrated interaction with other types of controls, and a significantly more diverse gesture lexicon. For such applications, the idea of using such coarse gestures becomes less appealing. Moreover, user/arm fatigue, among other factors typically becomes more of an issue. It would be desirable to develop another approach for more user-centric gesture recognition, capable of addressing the shortcomings of the current state-of-the-art.

It would therefore be beneficial to present a method and apparatus for overcoming the drawbacks of the prior art.

SUMMARY OF THE INVENTION

Therefore, in accordance with one or more embodiments of the present invention, a new approach is presented that addresses the shortcomings of the prior art, and that integrates user-centric gesture recognition (vs. screen-centric) with conventional mouse/keyboard interfaces. In accordance with one or more embodiments of the present invention, a new way of approaching the integration of gesture recognition into more traditional controls is presented; through which users can have a more natural computing environment. Sensors are preferably integrated into the keyboard with lenses enabling a wide field-of-view. Once a user's hands are lifted about four inches or so (or other desired distance) above the keyboard, the hands appear as objects in the field-of-view. The gesture recognition portion of the interface can then be activated, and users can interface with whatever user interface they wish. Users can also lift a single hand or both hands above the keyboard. Thus, the inventive system provides for a delineation of gesture recognition between an active zone that is enabled once the user's hand (or hands) is visible for the cameras and inactive zone when the user is typing on the keyboard or using the mouse. In such a situation, not only are the user's hands not visible by the cameras, but the use of the keyboard or mouse may be employed to further differentiate when the user wishes to activate the gesture recognition capabilities of the system. Of course, any combination of hand placement, mouse, and keyboard operation may be employed to determine activation of the gesture features of the system. Through the use of these various user interactions, a powerful interaction model can be provided to users and thus allowing for the comfortable use of gesture interaction in a system in which it would previously have been considered less useful.

In accordance with one or more embodiments of the present invention, the three-dimensional space above the keyboard may be partitioned into various interaction zones. Thus, a first zone may be provided above the hands of the users in which a first gesture may be recognized, such as a static or other gesture. A second zone may be provided adjacent the first zone so that movement from one zone to the other can be determined, thus allowing for the determination of a dynamic gesture, for example. Any number of such zones may also be provided, thus allowing for a determination of movement in any number of directions or distances. In accordance with these various embodiments of the present invention, users may be encouraged to use gestures for small, time-saving tasks, and not struggle with complex and tedious gestures, requiring a significant amount of coarse arm movements, although the system presented herein would be equally applicable to such gestures. As a result of the aforementioned information, there exists a dichotomy in which gestures enable fast-access tasks, such as minimize, maximize, pinch, select, etc. The more tedious and time-consuming tasks may still be conducted with more conventional interfaces such as a mouse and keyboard if desired by the user.

Still other objects and advantages of the invention will in part be obvious and will in part be apparent from the specifications and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIGS. 3(a) and 3(b) are flowchart diagrams depicting steps for gesture recognition in accordance with embodiments of the present invention;

DETAILED DESCRIPTION OF THE PREFERRED EMBODIMENTS

Figure 1:
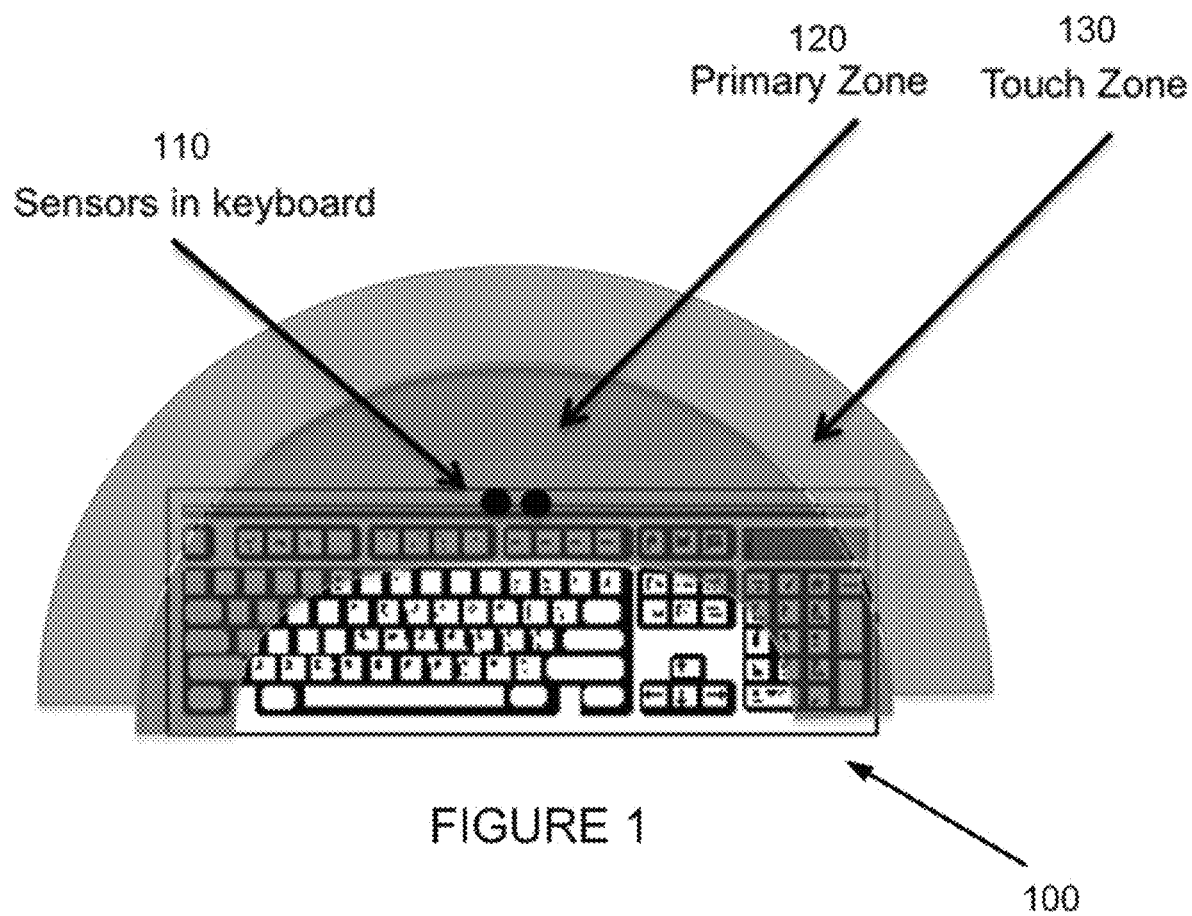
FIG. 1 depicts a view of a keyboard including sensors and interaction zones in accordance with a first embodiment of the present invention.

One or more embodiments of the invention will now be described, making reference to the following drawings in which like reference numbers indicate like structure between the drawings.

In accordance with the various embodiments of the invention, three main approaches to the integration of an inventive interaction dichotomy incorporating both traditional as well as multi-touch gesture events are preferably presented. These different approaches may be characterized by the following: the nature of interactivity that is associated with each; whether each involves the partitioning of the 3D space into active and passive regions, and whether each involves static and/or dynamic gestures.

First Approach: Integration of Confusion Learning with Static Gestures

A first approach to the development of a gesture lexicon or having a system learn a new gesture dictionary is preferably implemented through the utilization of confusion learning, defined in U.S. patent application Ser. No. 13/221,904, filed 31 Aug. 2011 to El Dokor et al. titled "Method and Apparatus for Confusion Learning", the contents thereof being incorporated herein by reference. As is described in this incorporated application, the system is trained on various hand gestures using a Belief Propagation Artificial Intelligence system, and one or more specialist subnets may be spawned to specialize in specifically identifying and/or predicting confusing user gestures. Once the gesture dictionary is trained, a useful approach would then be to integrate such a dictionary with a user interface, such as the gesture recognition system and apparatus as described in accordance with the various embodiments of the present invention.

Second Approach: 3D Space Partitioning into Active "Touch Point" Regions and Passive Regions A second approach in accordance with an embodiment of the invention preferably comprises creating a thin three-dimensional virtual membrane at a predefined position between the keyboard and the screen(s). The user can then traverse the membrane at multiple locations, enabling multiple touch points. This is preferably performed by mapping the local maxima (spatial maxima) in the membrane one-to-one onto screen points, and then enabling gesture events at these points. This three-dimensional mapping into two-dimensional touch points is efficient and intuitive, minimizing the learning curve.

Third Approach: Integration of Confusion Learning with Static Gestures Along with 3D Space Partitioning This preferred third approach consists of combining the first two approaches into a hybridized model that combines the intuitive benefits of three-dimensional mapping with the efficiency of static gestures through confusion learning. This approach is capable of adding significant value to three-dimensional gestures. Not only can three-dimensional gestures emulate their two-dimensional counterparts, but these three-dimensional gestures can also expand on the functionality of the two-dimensional counterparts, adding new features and capabilities. From an object-oriented viewpoint, three-dimensional gestures may be provided as one or more child classes of a parent two-dimensional class, inheriting various feature of the parent touch-based class, while expanding on such features into new features that may enhance user interactivity.

Overall Approach

In accordance with a preferred embodiment of the invention, and referring first to FIG. 1, a keyboard 100 is shown including a pair of stereo camera sensors 110 mounted on keyboard 100. These stereo cameras 110 further define a primary interaction zone 120, and a secondary touch zone 130. When employing this inventive keyboard in accordance with one or more embodiments of the present invention, depth is preferably first reconstructed from the pair of stereo sensors 110 integrated into keyboard 100, or otherwise associated with a keyboard or other "desktop" hardware component. As is further shown in FIG. 2 in conjunction with FIG. 1, the pair of stereo sensors preferably defines each of the primary interaction zone 120 and secondary touch zone 130 in accordance with a corresponding gesture region 200, having a height 210, depth 215 and width 220 defined in accordance with the field of view provided by the noted pair of stereo sensors. While gesture region 200 is shown as a rectangular prism, any desired shape may be employed, with appropriate sensors being employed.

Figure 2:
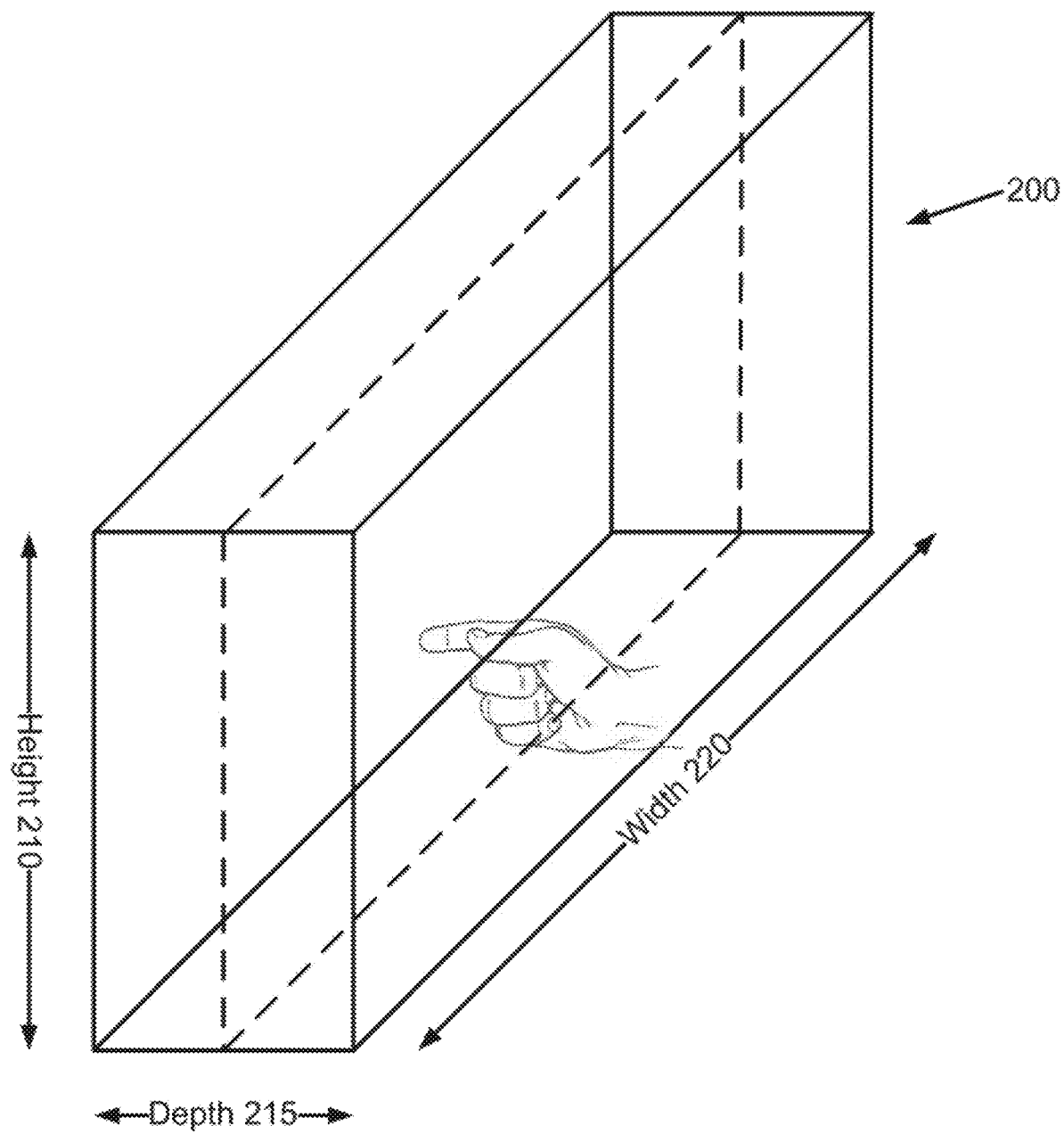
FIG. 2 depicts a perspective representation of an active gesture region.

As is shown in FIG. 2, when an object, such as the finger 230 of a user enters into gesture region 200 (corresponding to either primary interaction zone 120 or secondary touch zone 130) the pair of sensors recognizes entry into the region, and then enables gesture control of the apparatus associated with the keyboard, such as a computer or the like.

It is preferable to define gesture region 200 as beginning a predetermined distance above the sensors and keyboard 100 so that the hands of the user do not enter gesture region 200 during normal typing, mouse use, track pad use or the like. Rather, upon actively raising one or both of one's hands a predetermined amount, gesture interaction is enabled. Such predetermined height may be about four inches in an exemplary embodiment, but any desired height may be selected. Additionally, while gesture region 200 may be predefined, a user may also be permitted to determine the size and location of such gesture region. Further, the definition of the size and location of the gesture region may also be defined by learning of the habits of the particular user.

Additional trigger events may further be defined to enable and disable gesture recognition in accordance with one or more embodiments of the present invention. Thus, one or more embodiments of the present invention provide for activation of gesture recognition that is enabled zone once the user's hand (or hands) is visible for the cameras and therefore in an active zone, and that is disabled when the user is typing on the keyboard or using the mouse, and is thus their hands are out of a predefined portion of the field of view of the camera sensors, and thus in an inactive zone. In such a situation, not only may the location or position of the hands of the user be employed to enable and disable gesture based upon the hands visibility to the cameras, but the use of the keyboard or mouse may also be employed to further differentiate when the user wishes to activate the gesture recognition capabilities of the system. Any combination of hand placement, mouse, and keyboard operation may be employed to determine activation of the gesture features of the system. For example, when a user is typing on the keyboard, gesture recognition may be disabled. When the user is manipulating the mouse gesture recognition may be disabled. When the user is typing on the keyboard with one hand, gesture recognition may be enabled for the other hand. When the user is manipulating the mouse with one (preferably predefined) hand, gesture recognition may be enabled for the other hand. Through the use of these various user interactions, a powerful interaction model can be provided to users and thus allowing for the comfortable use of gesture interaction in a system in which it would previously have been considered less useful.

For a detailed overview of an example of a preferred depth approach that may be employed in accordance with the invention, as well as how they compare to some of the other existing methods, the reader is referred to U.S. patent application Ser. No. 13/025,038, titled "Method and Apparatus for Performing Segmentation of an Image", filed Feb. 10, 2011 to El Dokor et al., U.S. patent application Ser. No. 13/025,055, titled "Method and Apparatus for Disparity Computation in Stereo Images, filed February 10 to El Dokor et al., U.S. patent application Ser. No. 13/025,070, titled "Method and Apparatus for Determining Disparity of Texture", filed Feb. 10, 2011 to El Dokor et al., U.S. patent application Ser. No. 13/294,481, titled "Method and Apparatus for Enhanced Stereo Vision", filed 11 Nov. 2011 to El Dokor et al., U.S. patent application Ser. No. 13/297,029, titled "Method and Apparatus for Fast Computational Stereo" filed 15 Nov. 2011 to Cluster et al., U.S. patent application Ser. No. 13/297,114, titled "Method and Apparatus for Fast Computational Stereo", filed 15 Nov. 2011 to Cluster et al., and U.S. patent application Ser. No. 13/316,606, titled "Method and Apparatus for Enhanced Stereo Vision", filed 12 Dec. 2011 to El Dokor et al., the contents of each of these application being incorporated herein by reference.

Referring next to FIG. 3(a) a logical flow associated with an embodiment of the invention in which depth is reconstructed from the sensors (cameras) included in the keyboard is shown. As is first shown in FIG. 3(a), one or more images may be acquired in accordance with one or more images acquired by the pair of stereo cameras in the keyboard at step 310. Next at step 315 the system preferably identifies the presence of a user's hands in the FOV from the acquired one or more images. Additionally, other intended preconditions for enabling gesture recognition may also be determined. At step 320, depth is computed in accordance with the pair of stereo cameras in the keyboard, and further in accordance with one or more of the techniques noted above (or any other appropriate depth calculating method). Once depth is computed, the user's hands are preferably tracked in step 325, and touch points are defined with static gestures at step 330, preferably enabling specific events in accordance with one or more recognized static gestures.

Referring next to FIG. 3(b) a logical flow associated with an embodiment of the invention in which depth is reconstructed from the sensors (cameras) included in the keyboard is shown. As is first shown in FIG. 3(b), one or more images may be acquired in accordance with one or more images acquired by the pair of stereo cameras in the keyboard at step 350. Next at step 355 the system preferably identifies the presence of a user's hands in the FOV from the acquired one or more images. Additionally, other intended preconditions for enabling gesture recognition may also be determined. At step 360, depth is computed in accordance with the pair of stereo cameras in the keyboard, and further in accordance with one or more of the techniques noted above (or any other appropriate depth calculating method). Once depth is computed, the user's hands are preferably tracked in step 365, and touch points are defined with dynamic gestures at step 370.

Figure 4:
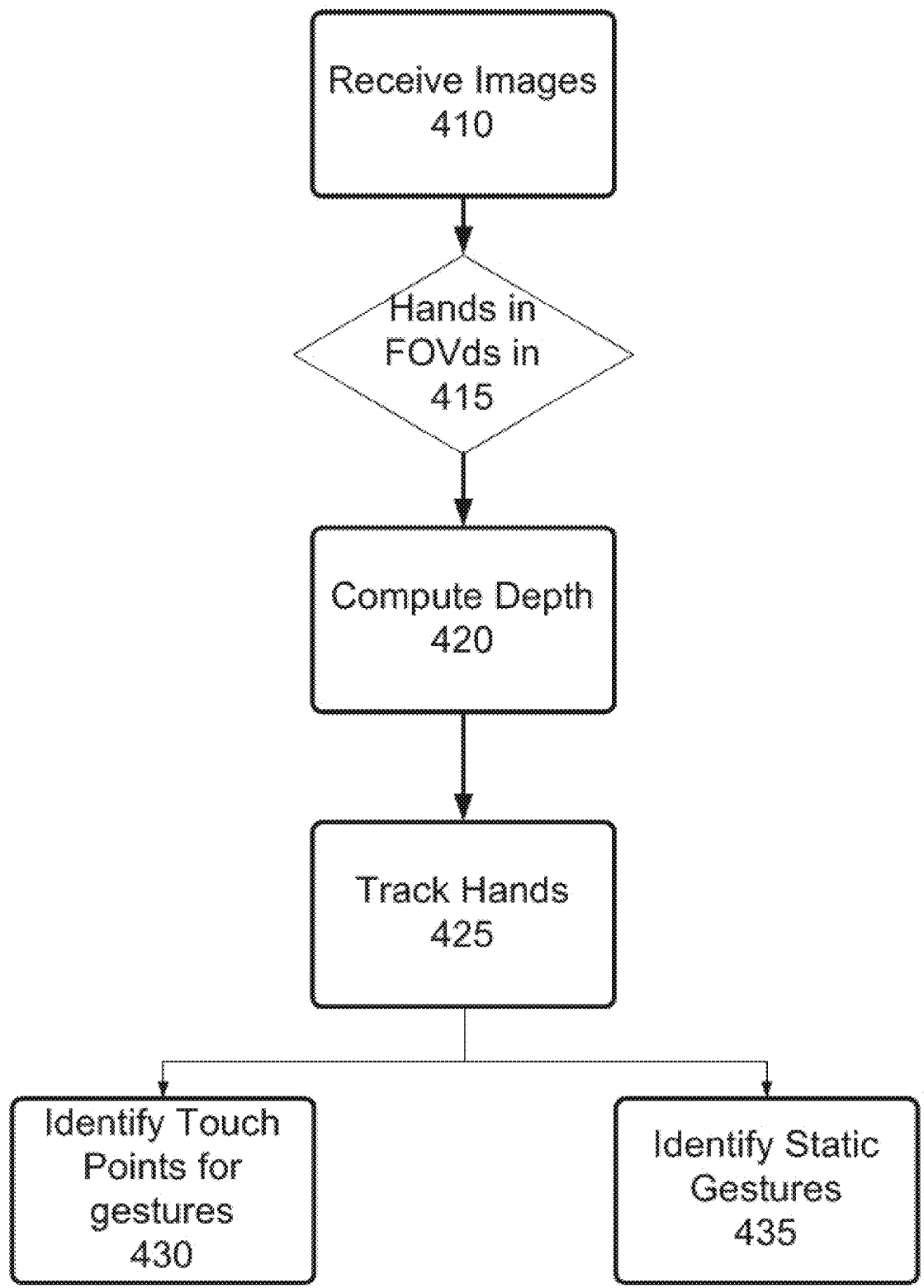
FIG. 4 is a flowchart diagrams depicting steps for gesture recognition in accordance with an embodiment of the present invention.

Referring next to FIG. 4 a logical flow associated with an embodiment of the invention in which depth is reconstructed from the sensors included in the keyboard is depicted. As is first shown in FIG. 4, one or more images may be acquired in accordance with one or more images acquired by the pair of stereo cameras in the keyboard at step 410. Next at step 415 the system preferably identifies the presence of a user's hands in the FOV from the acquired one or more images. Additionally, other intended preconditions for enabling gesture recognition may also be determined. At step 420, depth is computed in accordance with the pair of stereo cameras in the keyboard, and further in accordance with one or more of the techniques noted above (or any other appropriate depth calculating method). Once depth is computed, the user's hands are preferably tracked in step 425, and touch points are defined either with dynamic gestures at step 430, or with static gestures at step 435, preferably enabling specific events in accordance with one or more recognized static gestures.

The different interaction paradigms represent different ways in which such an implementation may take place in accordance with one or more embodiments of the invention.

Defining the Mapping Functions of the Three Approaches

For the first approach (FIG. 3(a)), in which predefined gestures are integrated into click and touch events, users' hands are preferably first mapped onto the screen. Various touch gestures may be enabled through a gesture API or through sending click events.

For the second approach (FIG. 3(b)), two preferred mapping functions for the above-defined two different interaction zones are preferably applied. The first is preferably a mapping function that is inherently many-to-one, mapping three-dimensional hand positions onto the two-dimensional scene. The second preferred mapping function defines touch events that are associated with various gestures. In accordance with one or more embodiments of the present invention, the three-dimensional space above the keyboard therefore may be partitioned into various interaction zones. Thus, a first zone may be provided above the hands of the users in which a first gesture may be recognized, such as a static or other gesture. A second zone may be provided adjacent the first zone so that movement from one zone to the other can be determined, thus allowing for the determination of a dynamic gesture, for example. In such a manner, crossing a border between such interaction zones may be employed to define a touch interaction or the like. Any number of such zones may also be provided, thus allowing for a determination of movement in any number of directions or distances. Mapping is preferably performed by first clustering changes in smaller regions near depth maxima, computing their centroids, and then mapping their values onto the second "touch zone" (See FIG. 1)

Consider the depth map, D(x,y,z), and a virtual touch membrane (or border between defined interaction zones), defined at a specific y-coordinate location yi, T(x, y=yi, z). The binary mask associated with the intersection of the two images defines the interaction region, and is preferably given by:

$$I(x,y,z)=D(x,y,z) \cap T(x,y_i,z)$$

For the third approach (FIG. 4), representing a combination of the first two approaches, the two (or more) zones of interaction defined in the second approach are preferably be enabled, as well as some static gestures, as defined in the first approach.

In an example implementation that typifies this approach, an email alert may appear on the bottom of the screen as the user is typing and using the mouse. The user may extend his/her arm in the direction of the alert, maximizing the message. The user may then proceed to flipping through the email, minimizing it, expanding it, or simply closing it, all with hand flicks enabled with the proximity-based keyboard. The user is therefore able to continue to utilize gestures until he/she brings their hands back down to the keyboard again (or employs some other device or the like that indicates a desire to disable gesture recognition), at which point gesture recognition is suspended as the user's hands leave the predefined interaction zone.

This approach represents a departure from frontal approaches that are tedious to enable in more natural settings where the user does not necessarily wish to extend their arms too far away from their keyboard as they work. Computing requires ease of use, simplicity and responsiveness, features that are easily enabled in accordance with embodiments of the present invention. Therefore, in accordance with the various embodiments of the invention, the user moves their hands or other gesture object in a direction that is perpendicular to the sensor locations, rather than parallel to a field of view thereof. In this manner, determination of movement between one or more defined interaction zones is simplified, and thus allowing for the determination of less exaggerated movements on the part of the user. In a still further example in accordance with an alternative embodiment of the invention, a user may play a virtual piano, the playing being preferably implemented with two interaction zones such that the primary zone is used to track the fingers of a user's hands, and the second zone is traversed by moving the hands forward. Movement from the primary zone to the second zone (and thus traversing the border therebetween) preferably indicates a touch interaction. The primary zone and touch zone are preferably both three-dimensional interaction zones. Of course, any number of such interaction zones may be employed to provide still further user control over desired interactions.

Hardware

Figure 5:
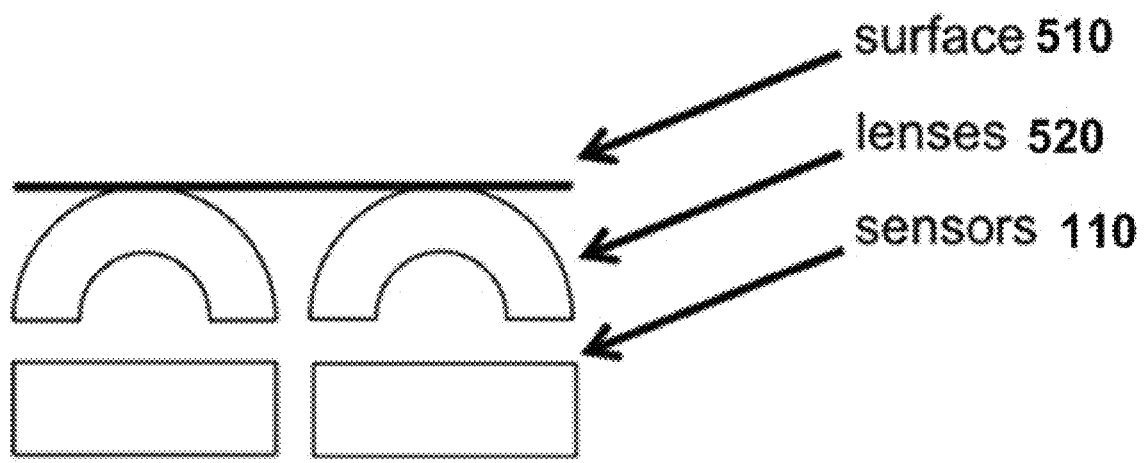
FIG. 5 depicts sensor structure in accordance with an embodiment of the invention.
Figure 6:
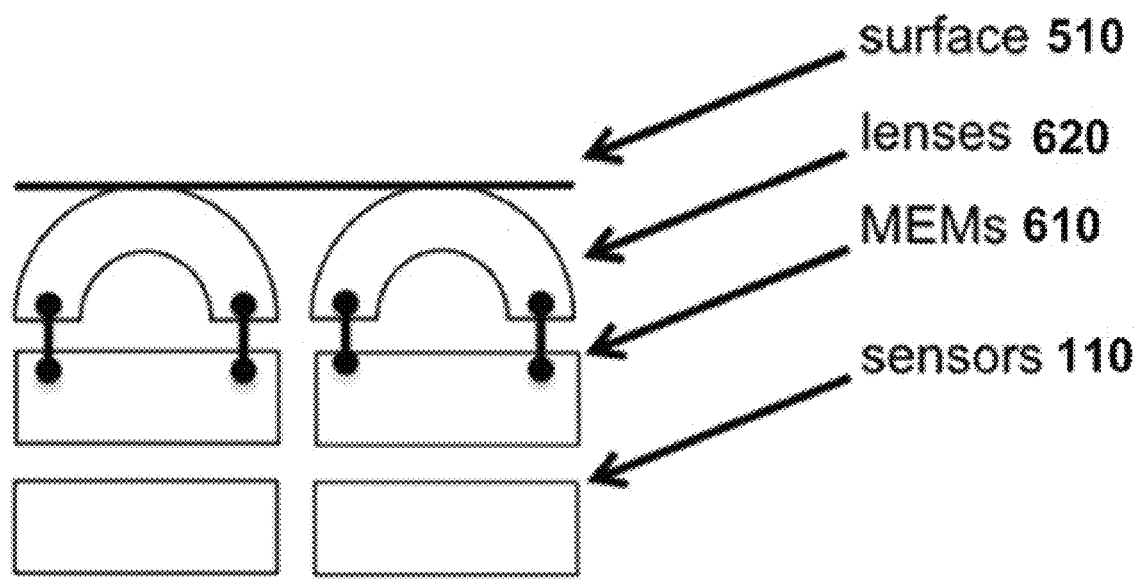
FIG. 6 depicts sensor structure employing one or more MEMS in accordance with an alternative embodiment of the invention.

As is next shown in FIG. 5, sensors 110 may be integrated into the keyboard with only lenses visible at the surface of the keyboard 100. FIG. 5 depicts an overview of a novel apparatus combining the ability to determine 2D and 3D gestures in a touchpad of a keyboard apparatus. As is shown in FIG. 5, sensors 110 and lenses 520 are preferably mounted under a glass pad 510. The keyboard's data communication protocol may be modified to account for, both, streaming video as well as keyboard commands. An alternative integration approach may also be enabled (shown in FIG. 6) by using micro-electronic machines (MEMs) 610, integrated under the lenses 620, adaptively modifying the FOV as well as the focal length associated with the lens/cameras combination as desired or controlled in accordance with the MEMs 610, depicted in FIG. 6. FIG. 6 depicts an overview of a novel apparatus combining 2D and 3D gestures in a touchpad with MEMs manipulating lenses. MEMs also have the ability to allow the sensors to follow the user's hands or other objects of interest in the field-of-view. These MEMs may move the entire baseline or just parts of it.

Alternative Hardware Configuration

Figure 7:
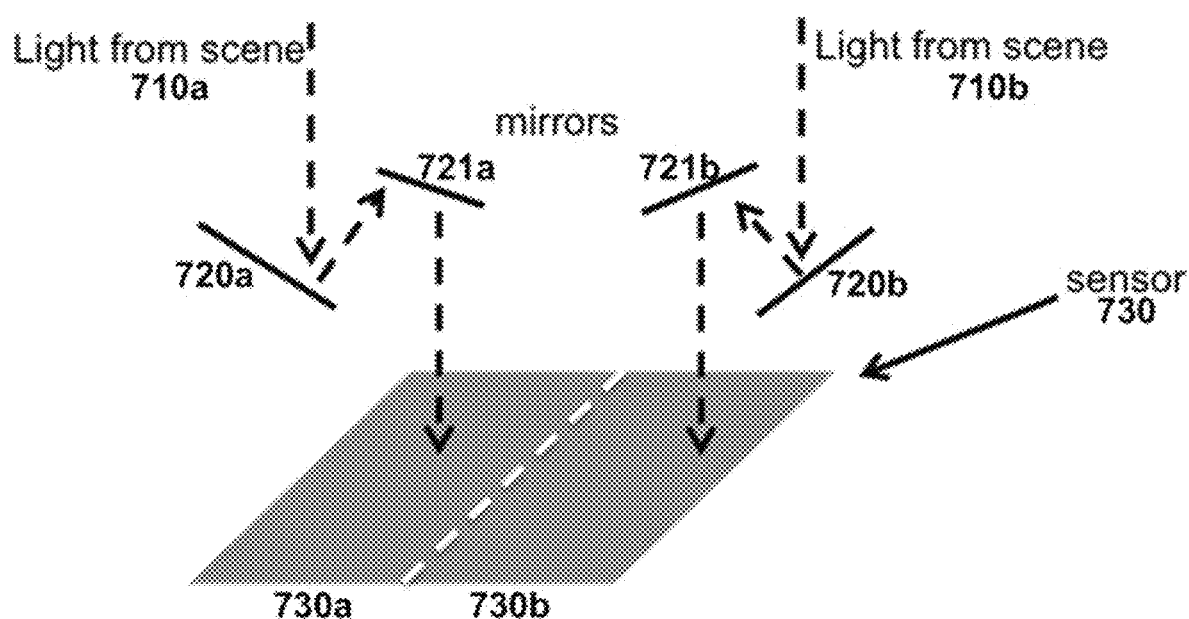
FIG. 7 depicts the use of a single sensor element in accordance with an embodiment of the invention.

A new approach to creating stereo images can be enabled by creating an alternative hardware configuration in accordance with an alternative embodiment of the invention that utilizes one or more mirrors to create a stereo effect. As is shown in FIG. 7, multiple views of a scene can be received at the same imager, on different parts of the imager, to produce a stereo pair of images. Thus, scenes of an image 710a, 710 b may be received, and may be directed by mirrors 720a, 721a and 720b, 721b, respectively to direct the image scenes to respective portions 730a, 730b of a sensor 730. This may be accomplished by placing the imager (sensor 730) at the center of a harness (not shown), for maintaining and positioning multiple mirrors, thus leading to two images being subtended on the imager from two separate sets of mirrors, covering different angles of the field-of-view. Light is preferably reflected from the scene onto the mirror configuration, and reflected back onto the imager. The two images are therefore preferably received on the single imager and utilized in a similar set of algorithms that were presented earlier, and that have been presented in more detail in the '038, '055 and '070 applications noted above. Adding MEMs, or a relevant switching mechanism coupled with one or more of mirrors 720a, 721a, 720b, 721b, may enable the mirrors to be tilted inwards or outwards, changing the baseline that is associated with the stereo images, but also changing the point of convergence of the light.

Interaction—New Gesture Library

Given the interaction that is enabled through one or more devices provided in accordance with one or more embodiments of the invention, new interaction paradigms may be developed. One of which, mentioned earlier, may attempt to exploit existing touch screen gesture lexicons to produce multitouch events via an existing multitouch lexicon. One such approach defines two interaction zones, depicted in FIG. 1, in which one interaction zone defines the mapping region for the cursor and another interaction zone defines the touch regions.

Combining Frontal and Keyboard-based Interactions

It may also be useful to combine the use of one or more peripheral gesture devices with the use of the inventive keyboard into the same end-user applications. This is particularly useful if applications require multiple three-dimensional views. To enable such an approach, both input data streams from the two sensors may be integrated into the same application. The data from the screen/monitor area may be generated by either a time-of-flight or structure light sensor. It may also be generated along the same approaches in the '038, '055 and '070 applications noted above, or in any other known manner.

Updating the Background

A background model of the scene is preferably constantly updated to remove effects from lighting sources, peripheral motion, and any other aspect of the field-of-view that may affect system performance. This new background can be constantly updated while, for example, the mouse or keyboard is in use since the user's hands are not in the field of view. Once the mouse is inactive, or other indication of desire to initiate gesture recognition in accordance with one or more embodiments of the present invention, gesture recognition is initiated and background updating is preferably suspended.

Enabling a pinch gesture: in one embodiment, a pinch gesture, very similar to the one that is available in multi-touch interfaces, is enabled by training a belief propagation AI on a number of input images representing various stages associated with a pinch gesture. The pinch gesture can then be integrated into iOS and Windows 8 multitouch.

Refining the Depth Map

To provide more depth fidelity, an approach in which surfaces may be further refined by segmenting them horizontally or vertically is also defined in the '038, '055, 070, '481, '029, '144 and '606 applications noted above. Much along the same lines, depth estimates may be further refined to compute more accurate depth estimates. As a result, accurate computation of the fingers three-dimensional location can be obtained.

Combining Touch and Gesture Keyboard

Another approach contemplated in accordance with various embodiments of the invention combines gestural interfaces with touch, to produce an implementation that enables users to use touch or multitouch. Users can either touch the screen, or move their hands away from the screen, enabling gestures. In this approach multitouch gestures become a parent class of 3D gestures, inheriting the parent gestures' many properties and states, but yet adding more features and more degrees of freedom to these gestures.

Integrating Touch Screen with Dual Sensors

The dual sensors in this configuration can be placed underneath non-scratch surface glass, with the lenses placed between the surface and the lenses as described above. A GPU is preferably used to accelerate the computation of either 2D or 3D gestures, depending on a position of the users' fingers that may be located either away from or close to the glass. As a result, a control mechanism is highlighted in accordance with an embodiment of the invention that combines 2D and 3D gestures.

Integrating Frontal Controls—Exploiting Lens Warping

The peripherals of the field-of-view offer an opportunity to interact with the system while users are standing up or are otherwise parallel to the cameras or otherwise outside a center of the field of view of the cameras. Radial distortion is usually considered a lens/geometric aberration that is caused by the way lenses bend rays of light (Sonka, Hlavac, & Boyle, 2008). While radial distortion and its associated side effects are generally treated as problems requiring dewarping functions and fixes, such aberrations may give valuable insight into depth-based information. This is true even for peripherally located objects. An idealized distortion is presented, where objects on the periphery give valuable insight into the three-dimensional information of the lenses' FOV. Scenes with fisheye lenses or even some wide-angle lenses are not only corrected for radial distortion, but in a stereo implementation, they also have to be corrected for in the z-dimension. This is necessary since such lenses project 3D information onto the imager's x-y dimensions. Radial distortion functions that are typically associated with two-dimensional (x-y) values become inadequate in capturing true events being displayed in the field-of-view. A typical radial distortion function, r, is given by (Sonka, Hlavac, & Boyle, 2008)

$$r = \frac{\bar{r}}{\sqrt{(x-x_o)^2 + (y-y_o)^2}}$$

where (x,y) represents a pixel in the image that is distortionless, and $(x_o, y_o)$ represents the principle point. The projection itself captures parts/components of all three dimensions, and is inherent to the distortion, in approximately radially increasing distances from the principle point. The projection also has the same dimensions as the real-world data, making it, more specifically, a bijection. Depth may also preferably be reconstructed from stereo sensors in a manner similar to the '038, '055 and '070 applications, as mentioned earlier. One now has a radially distorted depth reconstruction (x,y,z), being projected on (x',y'), with z being approximated by the computed z'. Partial extraction of the true depth value can be accomplished, while evaluating a transformed, distorted image.

An Alternate Approach to Stereo with Omnidirectional/Fisheye Lenses

Fisheye, or Wide-Angle Lenses offer significant advantages over narrower field of view lenses. In addition to providing a wider FOV, the degree of distortion in the field-of-view can sometimes be indicative of location of objects, relative to the baseline that is associated with stereo sensors. However, most approaches to computational stereo with fisheye/omnidirectional lenses have mostly focused on de-warping the images first. In doing so, images are fixed for their radial distortion, as mentioned earlier, and then a given disparity estimation approach is utilized. In accordance with one or more embodiments of the present invention, the problem of computing stereo from a pair of sensors with omnidirectional lenses is considered and implemented quite differently from standard methods.

Various relevant equations that are associated with the inventive method for computing depth, relating depth to disparity, as well as depth-based scaling will now be presented.

Depth Estimation and Scaling Relationships for Computational Stereo

Figure 8:
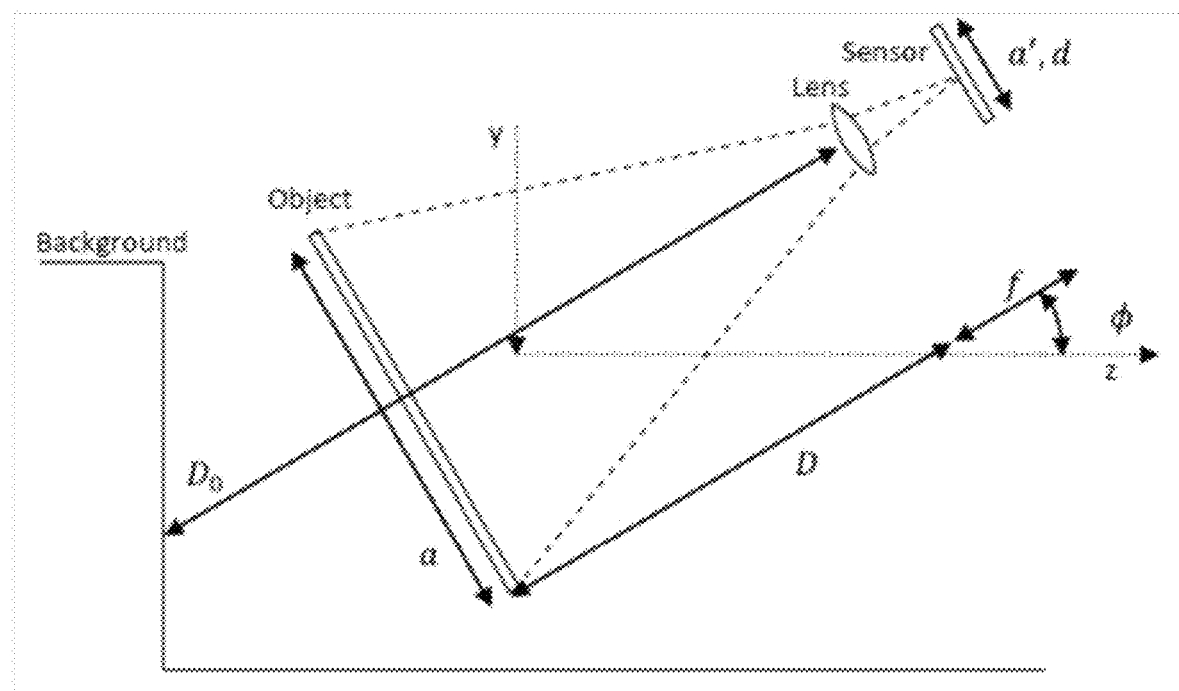
FIG. 8 depicts depth estimation and scaling techniques in accordance with an embodiment of the invention.

As illustrated in FIG. 8, depth scaling may be derived from the relationship between an object's actual size, a, and its apparent size in pixels on a camera sensor, a'.

The relationship between the size of an object and its distance from the camera is given as:

$$a' = a\left(\frac{fk}{D}\right) \quad \text{Equation A1}$$

Where a' is the apparent size of the object, a is the actual size of the object. D is the object's distance from the camera, φ is the orientation angle, f is the focal length, and k is a conversion factor representing resolution, or the number of pixels per unit focal length. The object's distance can be expressed as a function of its average disparity value, d:

$$D = \frac{Bfr}{W_p(d+C)} \quad \text{Equation A2}$$

Where B is the baseline distance between the stereo-pair, r is the ratio of the camera's native resolution to the downsampled resolution used to generate the disparity map. $W_p$ is the physical width of a pixel, and C is an alignment coefficient that is given by:

$$C = \frac{Bfr}{W_p D_0} - \frac{O_{H0} - O_H}{2} \quad \text{Equation A3}$$

Where $D_0$ is the distance to an object at zero disparity, defined as the background's disparity in this implementation, $O_{H0}$ is the horizontal alignment setting, which yields zero disparity at $D_0$, and $O_H$ is the current alignment setting. As shown in Figure A1, if the camera setup is oriented at an angle, φ, such that a portion of an object's size is projected onto another axis, disparity (and in effect distance) must be corrected according to the change in the object's size. This can be presented as:

$$D = \frac{Bfr}{W_p(d\sin\phi + C)} \quad \text{Equation A4}$$

Combining Equations A1 and A4, an object's size in pixels can be computed from its physical dimensions, a, and disparity value, d as:

$$a' = a\left(\frac{fk}{\frac{Bfr}{W_p(d\sin\phi + C)}}\right) \quad \text{Equation A5}$$

Which can be rewritten as:

$$a' = a\left(\frac{kW_p(d\sin\phi + C)}{Br}\right) \quad \text{Equation A6}$$

Similarly, a depth based scaling factor can be computed from the ratio of the size of an object at a neutral depth to the size of the object at the current depth:

$$s = \frac{a'_{neutral}}{a'_{current}} = \frac{a\left(\frac{kW_p(d_{neutral} + C)}{Br}\right)}{a\left(\frac{kW_p(d_{current}\sin\phi + C)}{Br}\right)}$$

As a result, equation A6 can be simplified into:

$$s = \frac{d_{neutral} + C}{d_{current}\sin\phi + C} \quad \text{Equation A7}$$

If the resolution between the x and y dimensions is exceedingly different, the scale can be adjusted to even the resolution, k, between the dimensions. Assuming $k_x \gg k_y$, then equation A7 can be simplified and rewritten into its x- and y-components:

$$s_y = \frac{k_y}{k_y} s = s \quad \text{Equation A8}$$

$$s_x = \frac{k_y}{k_x} s$$

Equation A8 governs the relationship between depth and scale for scaling between different camera configurations; however, the current disparity must be re-mapped to the trained stereo pair according to real-world distance, where $$D = \frac{B_c f_c r_c}{W_{pc}(d_{current}\sin\phi_c + C_c)} \text{ and} \quad \text{Equation A9}$$

$$d_{trained} = \frac{1}{\sin\phi_t}\left(\frac{B_t f_t r_t}{DW_{pt}} - C_t\right) \text{ yield:}$$

$$d_{trained} = \frac{1}{\sin\phi_t}\left(\frac{B_t f_t r_t}{\frac{B_c f_c r_c}{W_{pc}(d_{current}\sin\phi_c + C_c)}W_{pt}} - C_t\right)$$

In addition, the overall scale must be reduced by the reduced by the ratio of the trained to the current focal length:

$$s = \left(\frac{f_{trained}}{f_{current}}\right)\frac{d_{neutral} + C}{d_{trained}\sin\varphi + C}$$

Relationship with Other Electronics Devices

Given that such a device can interface with more than just a computer or laptop, in accordance with one or more embodiments of the invention, the inventive keyboard device can be envisioned to also interface with a TV, SmartTV, tablet or a smartphone. As an example, the Asus™ Transformer, enables an Asus™ tablet with a keyboard. However, users are typically inclined to touch the screen, leaving marks and making the interaction more cumbersome. Such an interaction can be simplified if sensors are integrated into the keyboard portion to enable 3D gestures. Another possible implementation involves interface a wireless keyboard with a Smart TV. The keyboard provides traditional computing functionality in the living room, while at the same time enabling pointing towards different content on the screen to access information. Such a device is significantly easier to use than a touch screen, an integrated tablet, or a mouse.

A new keyboard apparatus is therefore preferably presented that integrates a dual-camera system into the keyboard and enables 3D gestures, while maintaining standard functionality of mouse, keyboard, and multitouch. Various variations of the apparatus are presented as well as a representation of different hardware realizations. Interaction between the inventive keyboard, and one or more additional peripheral input devices, such as a mouse and the like, may be exploited in order to further determine desired gesture recognition timing and positioning. Finally, while the sensors in the keyboard have been described as stereo cameras, other cameras, such as time of flight, or other camera systems that provide depth information may also be employed if desired.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

The invention claimed is:

1. A gesture-enabled keyboard comprising:
   a keyboard housing comprising one or more keyboard keys for typing;
   a pair of stereo camera sensors mounted within the keyboard housing, a field of view of the pair of stereo camera sensors projecting substantially perpendicularly to the plane of the keyboard housing; and
   a pair of micro-electronic machines, each of the micro-electronic machines being coupled with, and adapted to adjust a position of a corresponding one of the pair of stereo cameras.

2. The gesture-enabled keyboard of claim 1, wherein a gesture region is defined within the field of view of the pair of stereo camera sensors.

3. The gesture-enabled keyboard of claim 2, wherein the gesture region further comprises a plurality of interaction zones.

4. The gesture-enabled keyboard of claim 3, further comprising a virtual membrane defining a region of transition from one of the plurality of interaction zones to another of the plurality of interaction zones.

5. The gesture-enabled keyboard of claim 4, wherein movement of a gesture object from one of the plurality of interaction zones to another of the plurality of interaction zones through the virtual membrane defining the region of transition therebetween defines a touch interaction.

6. The gesture-enabled keyboard of claim 2, wherein the gesture region is defined as beginning a predetermined distance above the one or more keyboard keys.

7. The gesture-enabled keyboard of claim 6, wherein gesture interaction is enabled when one or more gesture objects are positioned within the gesture region, and wherein gesture interaction is disabled when no gesture objects are within the gesture region.

8. The gesture-enabled keyboard of claim 5, wherein the one or more gesture objects comprise the hands of a user, and wherein the hands of the user are not within the gesture region when typing on the one or more keyboard keys.

9. The gesture-enabled keyboard of claim 2, wherein gesture interaction is disabled when one or more alternative input devices are in use, and where gesture interaction is enabled when the one or more alternative input devices are not in use.

10. The gesture-enabled keyboard of claim 9, wherein gesture interaction is further enabled only when one or more gesture objects are positioned within the gesture region, and the one or more alternative input devices is not in use.

11. The gesture-enabled keyboard of claim 9, wherein the one or more alternative input devices comprise one or more of a computer mouse, trackball, pointer and input pad.

12. The gesture-enabled keyboard of claim 10, wherein a background image in the field of view of the pair of stereo cameras is updated when the one or more alternative input devices is in use, and the background image in the field of view of the pair of stereo cameras is not updated when the one or more alternative input devices is not in use.

13. The gesture-enabled keyboard of claim 1, further comprising a pair of mirror systems, each of the pair of mirror systems being coupled with, and adapted to direct light received by a corresponding one of the pair of stereo cameras to a sensor.

14. The gesture-enabled keyboard of claim 13, wherein the sensor comprises a single sensor element.

15. A method for inputting a command to a computing system, comprising the steps of:
   providing a keyboard further comprising a keyboard housing comprising one or more keyboard keys for typing and a pair of stereo camera sensors mounted within the keyboard housing, a field of view of the pair of stereo camera sensors projecting substantially perpendicularly to the plane of the keyboard housing, and a pair of micro-electronic machines, each of the micro-electronic machines being coupled with, and adapted to adjust a position of a corresponding one of the pair of stereo cameras;
   defining a gesture region within the field of view of the pair of stereo camera sensors;
   determining whether one or more gesture objects are positioned within the gesture region determining whether one or more alternative input devices are in use; and
   enabling gesture interaction when one or more gesture objects are positioned within the gesture region, and the one or more alternative input devices are not in use.

16. The method of claim 15, further comprising the steps of:
   updating a background image in the field of view of the pair of stereo cameras when the one or more alternative input devices are in use; and
   fixing the background image in the field of view of the pair of stereo cameras when the one or more alternative input devices are not in use.

17. The method of claim 16, further comprising the step of generating a depth map of the one or more gesture objects in the gesture region when gesture recognition is enabled.

18. A gesture-enabled keyboard, comprising:
   a keyboard housing comprising one or more keyboard keys for typing;
   a pair of stereo camera sensors mounted within the keyboard housing, a field of view of the pair of stereo camera sensors projecting substantially perpendicularly to the plane of the keyboard housing, a background of the field of view being updated when one or more alternative input devices are in use; and
   a pair of micro-electronic machines, each of the micro-electronic machines being coupled with, and adapted to adjust a position of a corresponding one of the pair of stereo cameras;
   wherein a gesture region comprising one or more interaction zones and a virtual membrane defining a region of transition from one of the one or more interaction zones to another of the one or more interaction zones is defined within the field of view of the pair of stereo camera sensors;
   wherein gesture interaction is enabled when one or more gesture objects are positioned within the gesture region, and when the one or more alternative input devices are not in use.

\* \* \* \* \*